(12) United States Patent
Dexter

(10) Patent No.: US 11,618,508 B2
(45) Date of Patent: Apr. 4, 2023

(54) VEHICLE CARGO MANAGEMENT SYSTEM

(71) Applicant: Tim Dexter, Orland, CA (US)

(72) Inventor: Tim Dexter, Orland, CA (US)

( * ) Notice: Subject to any disclaimer, the term of this patent is extended or adjusted under 35 U.S.C. 154(b) by 245 days.

(21) Appl. No.: 17/123,998

(22) Filed: Dec. 16, 2020

(65) Prior Publication Data
US 2022/0185393 A1 Jun. 16, 2022

(51) Int. Cl.
*B60R 9/06* (2006.01)
*B62D 33/02* (2006.01)

(52) U.S. Cl.
CPC ............ *B62D 33/0207* (2013.01); *B60R 9/06* (2013.01)

(58) Field of Classification Search
CPC ........ B60R 9/06; B62D 33/08; B62D 33/0207
USPC .......................................................... 224/404
See application file for complete search history.

(56) References Cited

U.S. PATENT DOCUMENTS

| | | | | |
|---|---|---|---|---|
| 2,925,172 A * | 2/1960 | Hopp | ...................... | B60N 3/08 |
| | | | | 224/563 |
| RE26,299 E * | 11/1967 | Burns | ...................... | B60R 7/043 |
| | | | | 224/543 |
| 4,718,583 A * | 1/1988 | Mullican | ................... | B60R 9/00 |
| | | | | 224/543 |
| 4,737,056 A * | 4/1988 | Hunt | ........................ | B60P 7/15 |
| | | | | 410/151 |
| 5,340,004 A * | 8/1994 | Moore | ..................... | B60R 7/02 |
| | | | | 224/404 |
| 5,368,210 A * | 11/1994 | Wotring | .................... | B60P 7/08 |
| | | | | 224/558 |
| 5,628,442 A * | 5/1997 | Wayne | .................... | B60R 7/005 |
| | | | | 224/543 |
| 5,685,592 A * | 11/1997 | Heinz | ....................... | B60R 7/08 |
| | | | | 296/37.16 |
| 5,713,502 A * | 2/1998 | Dixon | ....................... | B60R 7/02 |
| | | | | 211/12 |
| 5,868,295 A * | 2/1999 | Carriere | ................... | B60R 9/00 |
| | | | | 224/404 |
| RE36,345 E * | 10/1999 | Moore | .................... | B60R 7/005 |
| | | | | 224/563 |
| 6,030,160 A * | 2/2000 | Moore | ...................... | B60R 7/08 |
| | | | | 410/97 |
| 6,070,775 A * | 6/2000 | Tolley | ....................... | B60P 7/08 |
| | | | | 224/404 |
| 6,129,253 A * | 10/2000 | Brown | ...................... | B60R 7/02 |
| | | | | 224/558 |

(Continued)

*Primary Examiner* — Peter N Helvey
(74) *Attorney, Agent, or Firm* — Apex Juris, PLLC; Tracy Heims; R Wylie

(57) ABSTRACT

A cargo management system including a truck bed organizer a first cross bar having opposing ends, wherein the first elongate cross bar has a dropped ledge portion spaced inward toward a midpoint from the opposing ends, a second linear cross bar having opposing ends, at least two side members joined to the opposing ends of the first cross bar and the second cross bar to form an opposing pair of corners, wherein a top edge or the at least two side members have connectors for detachably engaging a rail along a top edge of opposing sidewalls of the truck bed, and a pliable shell sized and configured to extend along a length of the at least two crossbars such the pliable shell is downwardly disposed from the opposing crossbars to form hollow compartment, wherein the pliable shell is configured to position a container whereby a lid is readily opened when the container is housed in the pliable shell.

11 Claims, 5 Drawing Sheets

(56) References Cited

U.S. PATENT DOCUMENTS

| | | | | |
|---|---|---|---|---|
| 6,349,865 B1* | 2/2002 | Tolley | B60P 7/08 | 224/543 |
| 6,507,701 B2* | 1/2003 | Lake | B60R 9/00 | 296/26.11 |
| 6,702,169 B2* | 3/2004 | Eipper | B60R 7/02 | 224/543 |
| 6,827,385 B2* | 12/2004 | Mobley | B60P 7/0892 | 410/129 |
| 6,974,170 B2* | 12/2005 | Mulvihill | B60P 7/14 | 224/42.33 |
| 7,028,872 B2* | 4/2006 | Lobanoff | B60R 5/047 | 211/85.15 |
| 7,318,617 B1* | 1/2008 | Scotton | B60R 5/045 | 224/567 |
| 7,665,790 B2* | 2/2010 | Oino | B60R 7/02 | 296/37.16 |
| 7,819,451 B2* | 10/2010 | Yoshida | B60R 5/047 | 410/118 |
| 8,117,691 B2* | 2/2012 | Bishop | A45F 3/22 | 5/118 |
| 8,192,118 B2* | 6/2012 | Zahorec | B60R 7/005 | 410/118 |
| 8,562,214 B2* | 10/2013 | Dozier | A45C 13/103 | 383/105 |
| 9,340,143 B2* | 5/2016 | Stakoe | B60P 7/0876 | |
| 9,592,767 B2* | 3/2017 | Stakoe | B60R 5/044 | |
| 9,738,226 B2* | 8/2017 | Kamada | B60R 5/047 | |
| 10,183,784 B2* | 1/2019 | Lau | A63H 33/00 | |
| 10,427,615 B2* | 10/2019 | Traxler | B62D 33/023 | |
| 10,562,457 B2* | 2/2020 | Stakoe | B60R 5/00 | |
| 10,647,241 B2* | 5/2020 | Davis | B60P 7/13 | |
| 10,773,651 B2* | 9/2020 | Dunham | B65D 81/38 | |
| 2005/0134075 A1* | 6/2005 | Kim | B60R 7/02 | 296/37.16 |

* cited by examiner

VEHICLE CARGO MANAGEMENT SYSTEM

FIELD OF THE INVENTION

The present invention relates to vehicle cargo management systems and more particularly to a cargo management system for pickup trucks or open utility trailers.

BACKGROUND OF THE INVENTION

Traditionally, pickup trucks have been primarily used for hauling and various construction and other projects. To facilitate secure and organized storage of tools for such projects, toolboxes have been a staple of truck bed management systems installed in truck beds. Pickup truck bed toolboxes are typically installed in the front of the bed, directly behind the cab thereby leaving most of the bed in back of bed open for traditional hauling. Like conventional toolboxes, partitions and cases for truck beds were largely designed and built for heavy duty traditional uses.

More recently, pickup trucks are commonly driven as a primary vehicle or for everyday use. However, conventional truck bed accessories are ill suited for organization and storage of the variety and types of items carried for such day-to-day activities. Many conventional systems built for industrial or construction use are heavy, awkward and not readily adaptable to the various items.

A further disadvantage of existing truck bed management systems is the lack of adaptive mechanisms to place them in an accessible or convenient location and to fit or hold variously items of differing shapes and sizes. Due to such shortcomings in known vehicle cargo management systems, items carried in truck beds are often unsecured, disorganized and inaccessible. Moreover, unfastened and unsecured items are subject to potentially damage due to movement induced by of sharp turns and sudden stops, or precipitation and are vulnerable to theft.

Hence, in the past, there has been a dearth of facile and adaptive cargo management accessories for securing, organizing and accessing a variety of items for everyday uses and activities. Thus, there persists a need for a facile and adaptive truck bed cargo management system that accommodates a range of pickup truck bed uses. In addition, there is a need for a cargo organizer that is easily accessed.

SUMMARY OF THE INVENTION

Addressing such and other needs, the present cargo management system provides a lightweight, readily adaptable and accessible truck bed organizer for carrying, storage and use of items. In a preferred embodiment, the present truck bed organizer a first cross bar having opposing ends, wherein the first elongate cross bar has a dropped ledge portion spaced inward toward a midpoint from the opposing ends, a second linear cross bar having opposing ends, at least two side members joined to the opposing ends of the first cross bar and the second cross bar to form an opposing pair of corners, wherein a top edge or the at least two side members have connectors for detachably engaging a rail along a top edge of opposing sidewalls of the truck bed, and a pliable shell sized and configured to extend along a length of the at least two crossbars such the pliable shell is downwardly disposed from the opposing crossbars to form hollow compartment, wherein the pliable shell is configured to position a container whereby a lid is readily opened when the container is housed in the pliable shell.

DETAILED DESCRIPTION OF THE EMBODIMENTS

Figure 1:
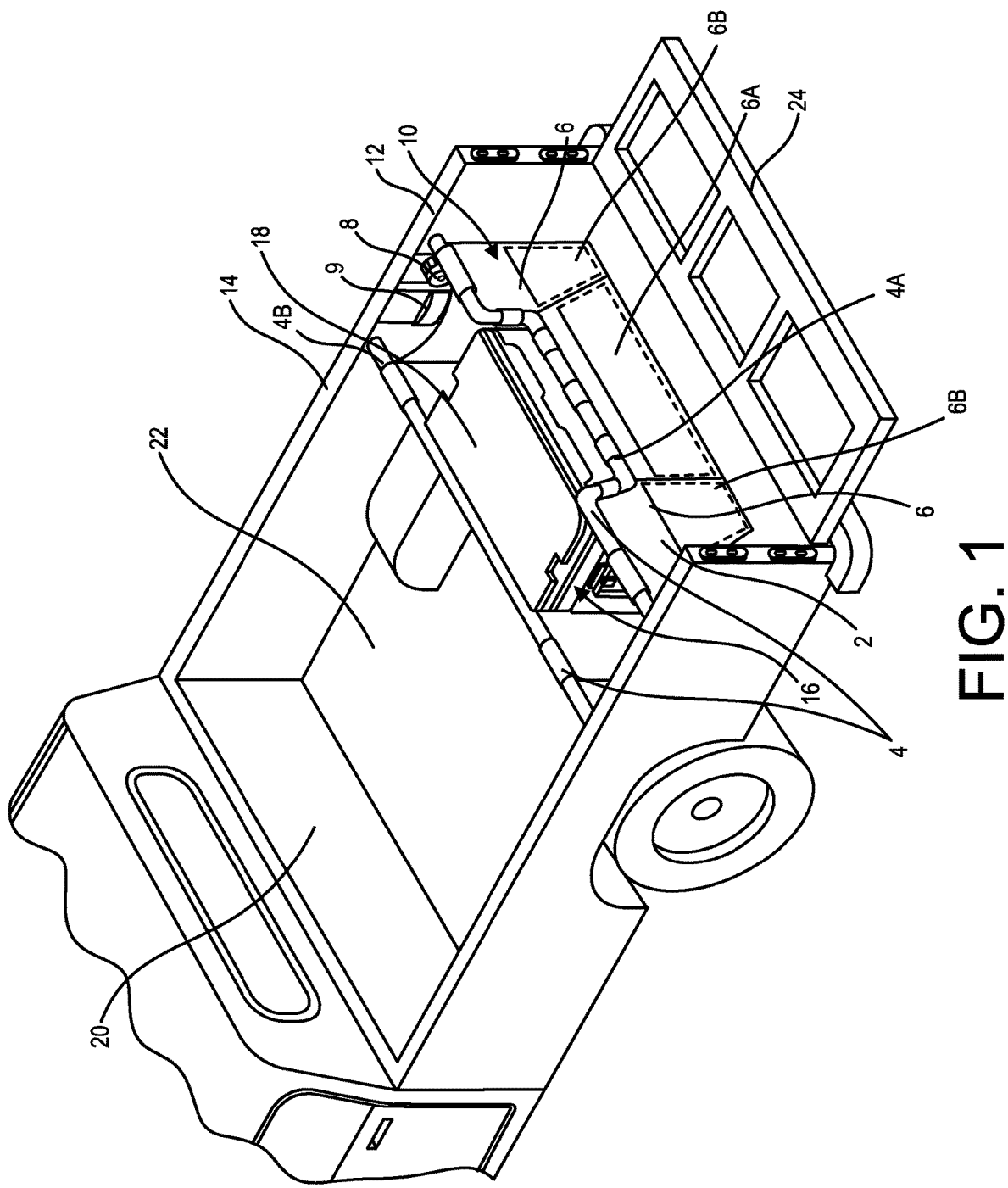
FIG. 1 is a perspective top view of an embodiment of the vehicle cargo management system according to the present invention.

Referring to FIGS. 1-5 illustrating a preferred embodiment of the present invention, truck bed cargo management apparatus 10 features a pliable shell 6 providing a hollow open compartment adaptable to variously shaped items and containers having opposing ends joined to at least two side members 2 to form an opposing pair of corners wherein a top edge of opposed ends of the at least two side members have connectors for detachably engaging a rail 14 along a top edge of opposing sidewalls of the truck bed 20; and a pliable shell 2 sized and configured to extend along a length of two cross bars 4 comprising of a first cross bar 4A and a second cross bar 4B such the pliable shell 2 is downwardly disposed from the opposing crossbars to form opposing side members joined to the opposing ends to form an opposing pair of corners, wherein a top edge of the opposing side members have connectors for detachably engaging a rail along a top edge of opposing sidewalls of the truck bed.

Figure 2:
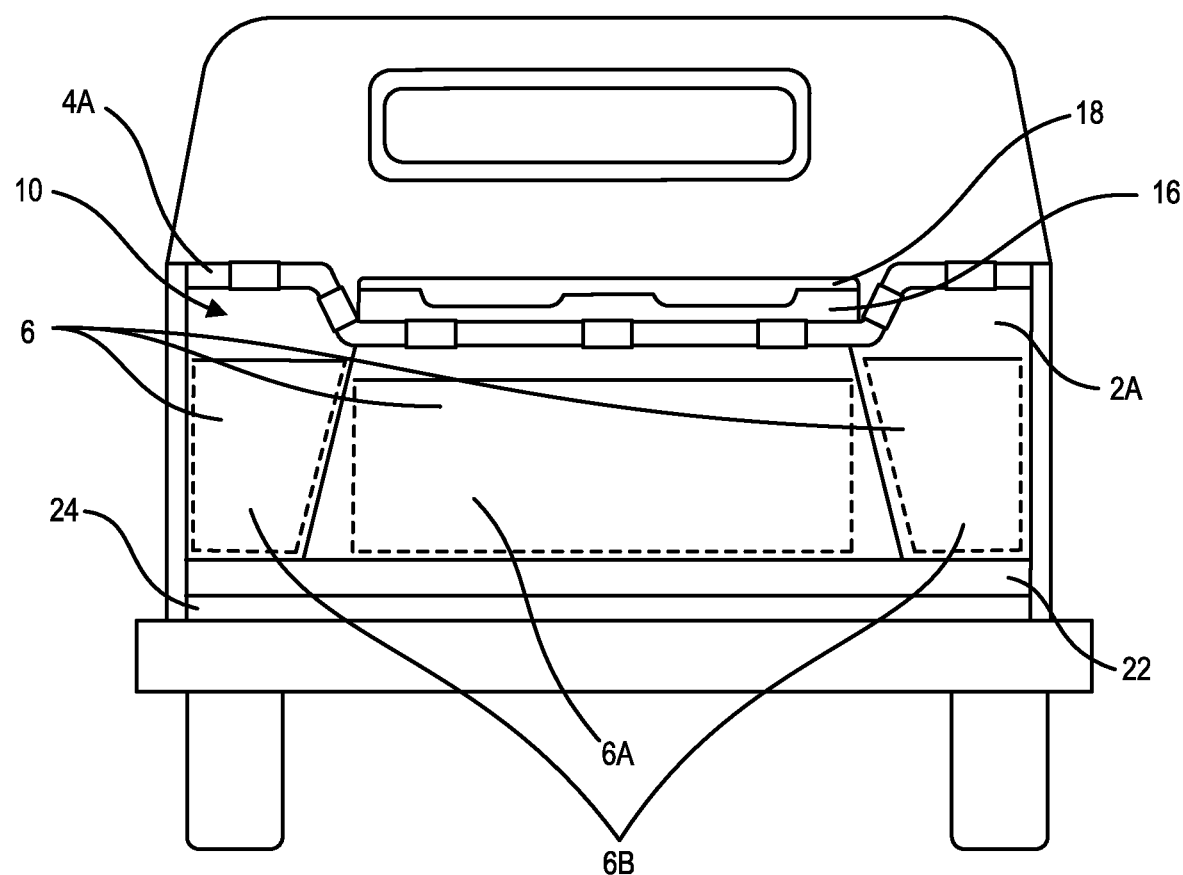
FIG. 2 is a rear perspective view of an embodiment of the vehicle cargo management system according to the present invention.
Figure 3:
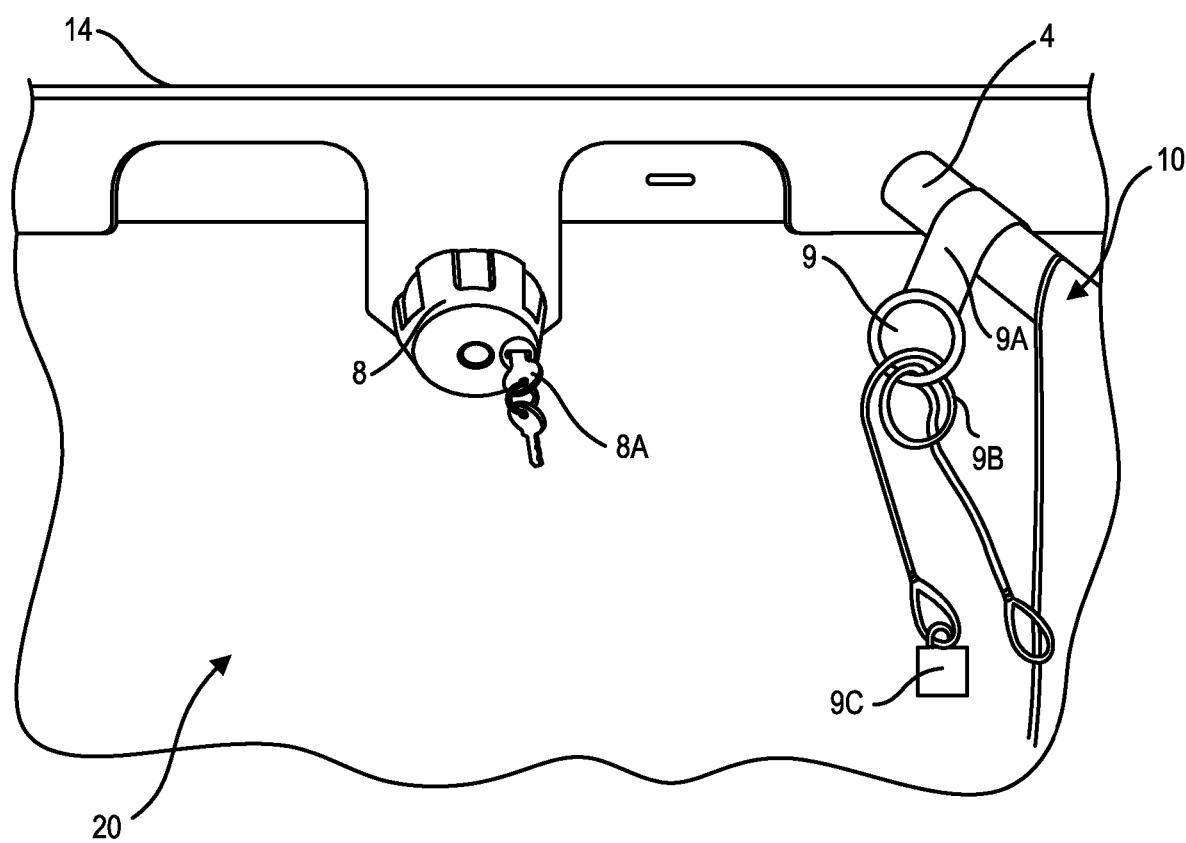
FIG. 3 is a close up view of the rotatable slide lock in a disengaged position according to an embodiment of the vehicle cargo management system according to the present invention.
Figure 4:
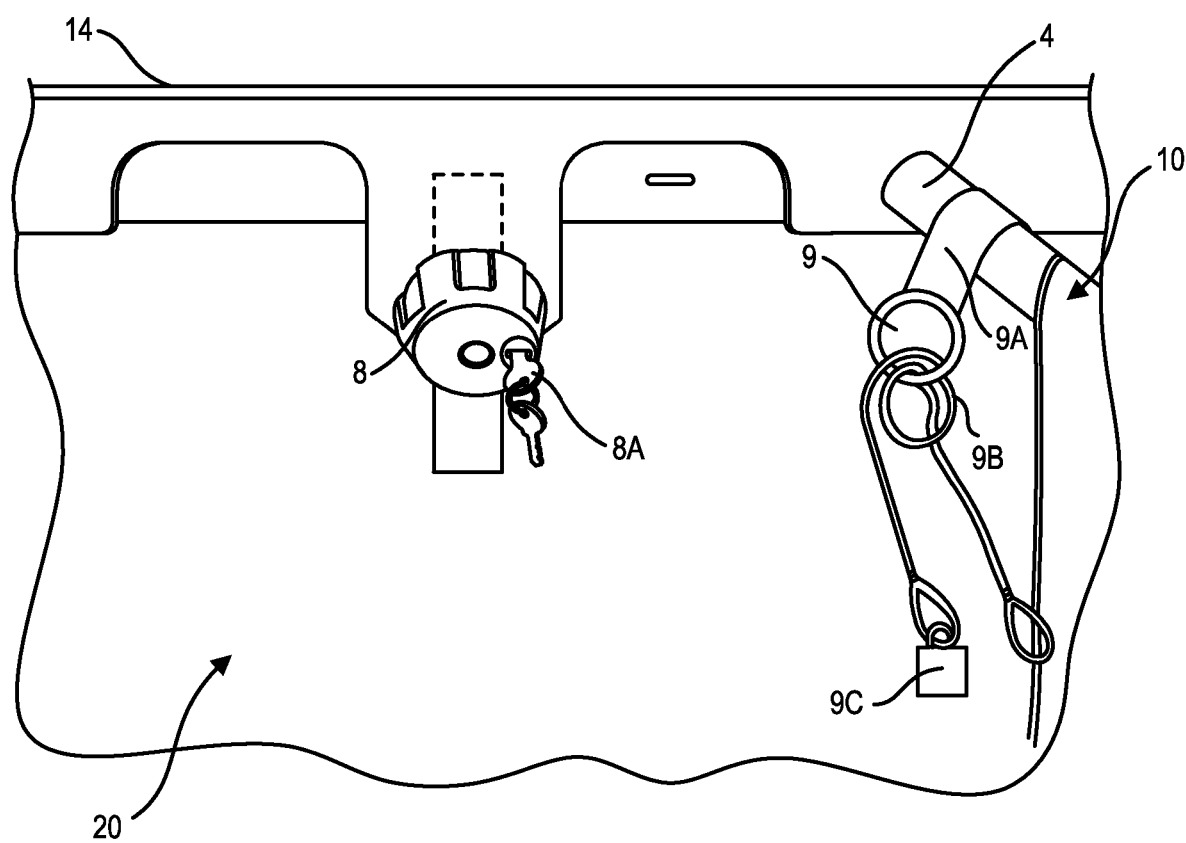
FIG. 4 is a close up view of the rotatable slide lock in an engaged position and also shows the ring and cable lock of an embodiment of the vehicle cargo management system according to the present invention.
Figure 5:
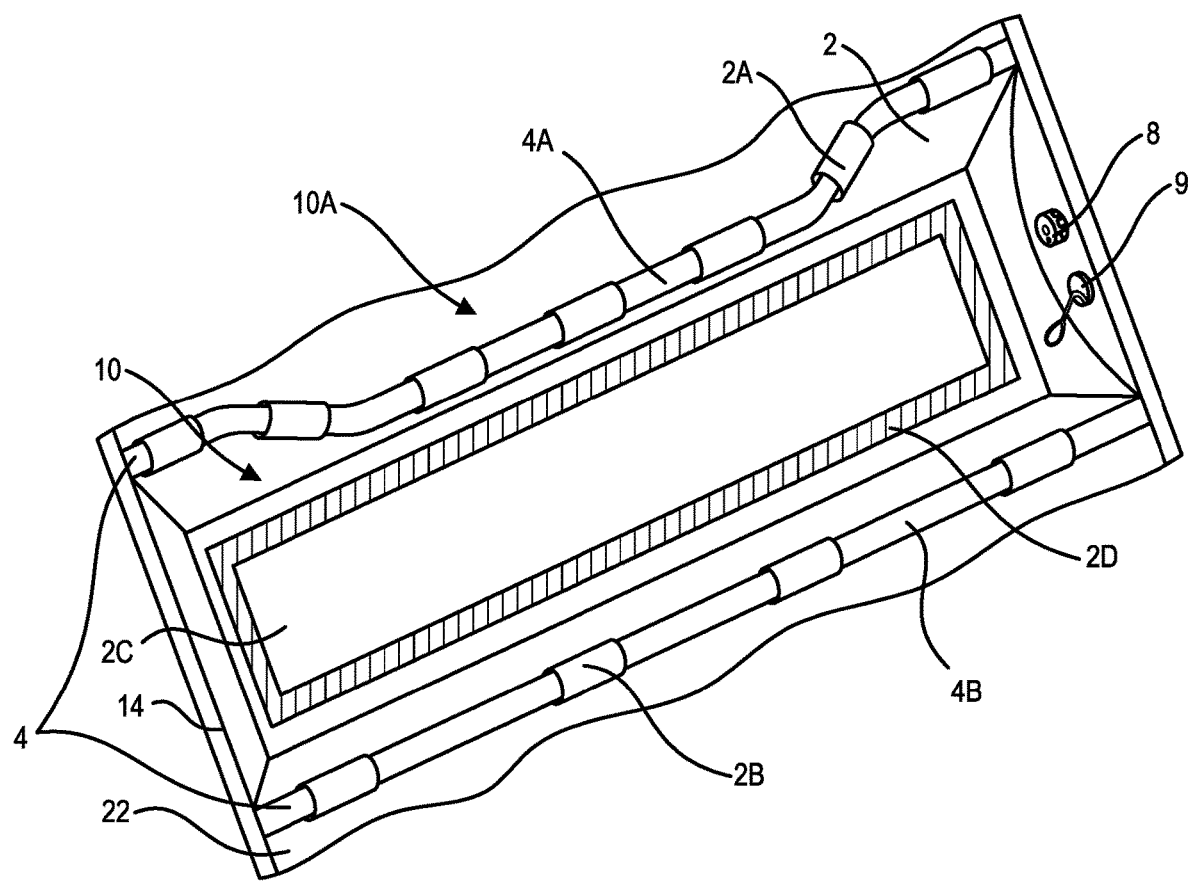
FIG. 5 is a top view of an embodiment of the vehicle cargo management system according to the present invention illustrating a drainage strip incorporated on the bottom portion of the vehicle cargo management system according to the present invention.

An outer facing surface 2A of pliable shell 2 may further feature pockets 6 including center pocket 6A left and right pockets 6B for storage and organization of smaller items. As shown in FIGS. 1 and 2, facing the pliable shell 2 surface proximate to the rear of the truck bed 20 facilitates ready access to pockets 6A and 6B and cooler 16 with lid 18 when tailgate 24 is opened.

A particularly preferred feature of embodiments such as illustrated in FIGS. 1-5 include a first elongate cross bar 4A having opposing ends, wherein the first elongate cross bar 4A has a dropped inner portion spaced inward toward a midpoint from the opposing ends. As best illustrated in FIGS. 1 and 2, the dropped inner portion is dimensioned to position first cross bar 4A below lid 18 of container 16 housed within truck bed cargo management system 10 so as to facilitate ready opening of lid 18 while container 16 is disposed in the hollow compartment. The illustrated embodiment further features elongate first cross bar 4A and second cross bar 4B having telescoping rods for adaptable engagement to sidewalls of variously dimensioned truck beds. Yet further features of preferred embodiments include configuring of pliable shell 2 in a size and shape so as to avoid contact with floor 22 of the truck bed 20 to avert contact with fluid or soiling of the bottom surface 2C of pliable shell 2. An additional feature for minimizing fluid or moisture retention in pliable shell 2 is provided by an open weave material 2D embedded in bottom surface 2C for drainage.

A further feature of embodiments of this cargo management system is a universal wedge lock 8 for secure engagement of the side members dampening movement of the claimed truck bed cargo carrier. In preferred embodiments, rotation of key 8A engages lock 8 rotates a planar wedge member into locked engagement with the truck bed sidewall and/or rail.

Embodiments of the present invention may also include a ring and cable lock 9 including wire rope 9B and padlock 9C for securing contents of the hollow compartment. The ring lock may be affixed to the side member 4 and hence requires no drilling or separate installation. A container or item may be secured by looping a wire rope 9B through a suitable aperture, such as, for example, a handle, on or attached to the product and padlocking two looped ends together. A particularly useful application loops the wire rope 9B through a cooler 16 handle and then secure looped ends to ring lock with padlock 9C thereby securing cooler 16 within truck cargo management system 10. Alternative embodiments (not shown) may attach a wire mesh or a tamper-proof lockbox to the ring lock for bolstered security.

Suitable materials for pliable shell 2 include any durable, flexible and waterproof material having a smooth surface adaptable to creating the hollow compartment and being securely connected to the first and second crossbars 4A and 4B. Exemplary materials may include synthetic fabrics such as, for example, nylon, polyester, polypropylene, and polymer blends thereof. Particularly preferred embodiments apply a UV resistant coating on the surfaces of the pliable shell to enhance durability and longevity of the cargo organizer.

In sum, the vehicle cargo management system according to the present invention provides a durable, adaptive, storage and organizer apparatus enabling convenient and facile access to items contained therein.

The description herein is not intended to delimit the scope of this invention which extends to various embodiments of the present invention. For example, alternative embodiments may vary the configuration of pockets 6 to adapt to particular items or applications. For example, a rounded configuration with a closure mechanism such as a zipper, clasp or gathered tether could be used on the upper edge to secure the contents therein. Alternatively, some embodiments may feature a single elongate pocket for carrying rods or lengthy items such as, for example, tent or fishing poles. In yet other embodiments contemplated by the present invention, the hollow compartment may be lined with a protective or insulating fabric or equipped with dividers to separate the hollow compartment into separate storage units. In alternative embodiments, a lid or other means for securing the cargo inside of the pliable shell may further be provided.

It is therefore contemplated that other embodiments not illustrated in the drawings or described herein are considered to be within the scope of the present invention as set forth in the claims. Accordingly, configurations and combinations shown and described not specifically shown may diverge from those claimed and specified herein. The scope of the present invention thus includes any equivalent configuration or combination of the embodiments described herein.

The invention claimed is:

1. A cargo management system for a truck bed, comprising:
   a plurality of cross bars including at least a first cross bar and a second cross bar having opposing ends affixed to corresponding side members, wherein the opposing ends have connectors for releasable engagement with corresponding sidewall rails along a top edge of opposing sidewalls of the truck bed; wherein the first cross bar has a dropped inner portion spaced inward toward a midpoint from the opposing ends; and
   a pliable shell sized and configured to extend along a length of the at least two crossbars such the pliable shell is downwardly disposed from the opposing crossbars to form a hollow compartment, wherein the dropped inner portion and pliable shell are configured such that a lid of a container placed in the hollow compartment is positioned above the dropped inner portion and thereby capable of being opened when the container is disposed in the hollow compartment.

2. The cargo management system of claim 1, wherein the hollow compartment does not contact a floor of the truck bed.

3. The cargo management system of claim 1, wherein the cross bars are telescoped for adaptable engagement to the sidewall rails.

4. The cargo management system of claim 1, further comprising a wedge lock releasably engageable with the sidewall of the truck bed configured for locking the side members into seated engagement.

5. The cargo management system of claim 4, wherein the engagement of a key for the wedge lock rotates a planar wedge member into locked engagement.

6. The cargo management system of claim 2, further comprising a ring lock affixed to a side member for looping a wire rope for engagement with a padlock to thereby secure a container being housed in the hollow compartment.

7. The cargo management system of claim 2, wherein the hollow compartment includes an open weave material for drainage.

8. The cargo management system of claim 7, further comprising a ring lock affixed to a side member, and a wire rope for threading through an enclosed opening, wherein the wire rope has opposed looped ends for engagement with a padlock.

9. The cargo management system of claim 1, wherein the container is a cooler.

10. The cargo management system of claim 1, further comprising at least one pocket affixed to an outer surface of the pliable hollow compartment.

11. The cargo management system of claim 10, wherein the outer surface whereon the at least one pocket is affixed faces toward the back of the truck bed when installed.

* * * * *